(12) United States Patent
Pino, Jr. et al.

(10) Patent No.: US 11,761,166 B2
(45) Date of Patent: Sep. 19, 2023

(54) ROADWAY ACCESS HOLE DRILL AND A METHOD OF MICROTRENCHING USING THE DRILL TO OPEN AN ACCESS HOLE IN THE ROADWAY

(71) Applicant: CCIIP LLC, New York, NY (US)

(72) Inventors: Angelo J. Pino, Jr., New York, NY (US); Daniel Urban, Austin, TX (US)

(73) Assignee: CCIIP LLC, New York, NY (US)

( * ) Notice: Subject to any disclaimer, the term of this patent is extended or adjusted under 35 U.S.C. 154(b) by 0 days.

(21) Appl. No.: 16/905,549

(22) Filed: Jun. 18, 2020

(65) Prior Publication Data

US 2021/0062464 A1 Mar. 4, 2021

Related U.S. Application Data

(63) Continuation of application No. 16/812,777, filed on Mar. 9, 2020, now Pat. No. 10,808,379.

(60) Provisional application No. 62/978,953, filed on Feb. 20, 2020, provisional application No. 62/892,698, filed on Aug. 28, 2019.

(51) Int. Cl.
| | |
|---|---|
| *E02F 5/10* | (2006.01) |
| *E02F 5/06* | (2006.01) |
| *E02F 5/08* | (2006.01) |
| *G02B 6/50* | (2006.01) |
| *E01C 11/00* | (2006.01) |
| *E02F 5/12* | (2006.01) |

(52) U.S. Cl.
CPC ............. *E02F 5/08* (2013.01); *E01C 11/005* (2013.01); *E02F 5/12* (2013.01); *G02B 6/504* (2013.01)

(58) Field of Classification Search
CPC ... E02F 5/08; E02F 5/12; E02F 3/8816; E02F 5/10; E02F 3/06; E02F 3/26; E02F 5/145; E02F 9/245; G02B 6/504; E01C 11/005; E01C 23/0933; E01C 7/35; E01C 2301/50; E01C 23/094; G01V 3/08; E21B 7/046
See application file for complete search history.

(56) References Cited

U.S. PATENT DOCUMENTS 1,406,185 A * 2/1922 Hansen .................... E21B 7/16
125/20
1,484,944 A * 2/1924 Hansen ............... E01C 23/0855
404/133.1

(Continued)

FOREIGN PATENT DOCUMENTS

| CA | 2348062 | 11/2001 |
| WO | 2016/088083 | 9/2016 |

OTHER PUBLICATIONS

Camplex Fiberoptic Extender, http://www.camplex.com/product.aspx?item=CMX-TACNGO-SDI, pp. 1-2.

(Continued)

*Primary Examiner* — Edwin J Toledo-Duran
(74) *Attorney, Agent, or Firm* — Jeffrey S. Melcher; Melcher Patent Law PLLC

(57) ABSTRACT

A method of cutting a microtrench in which the buried utility is exposed by opening an access hole in a roadway above the buried utility using a roadway access hole drill that rotates and vibrates the drill bit. A roadway access hole drill having a down-the-hole jack-hammer drill bit and a motor to rotate the down-the-hole jack-hammer drill.

6 Claims, 6 Drawing Sheets

(56) References Cited

U.S. PATENT DOCUMENTS

| | | | | |
|---|---|---|---|---|
| 1,830,751 A * | 11/1931 | Cornett | E01C 23/124 | 173/28 |
| 1,973,176 A * | 9/1934 | Richardson | E01C 23/0993 | 404/94 |
| 2,084,686 A * | 6/1937 | Howard | E21B 19/24 | 125/20 |
| 2,136,315 A * | 11/1938 | Pettit | B25D 17/11 | 181/200 |
| 2,409,397 A * | 10/1946 | Sheehan | H02H 5/12 | 37/906 |
| 2,665,117 A * | 1/1954 | Ivey | E21B 7/005 | 173/147 |
| 2,979,143 A * | 4/1961 | Kandle | E21B 7/02 | 175/122 |
| 3,113,626 A * | 12/1963 | Salisbury | E21B 7/028 | 173/27 |
| 3,179,184 A * | 4/1965 | Jackson | B28D 7/02 | 173/63 |
| 3,366,185 A * | 1/1968 | Heise | E01C 23/094 | 173/186 |
| 3,491,844 A * | 1/1970 | Kelly, Jr. | E01C 23/094 | 175/413 |
| 3,817,334 A * | 6/1974 | Bolt | E21B 19/086 | 173/187 |
| 3,934,661 A * | 1/1976 | Sauerwein | B23Q 11/0053 | 175/84 |
| 4,434,861 A * | 3/1984 | Howeth | E21B 21/015 | 175/209 |
| 4,555,833 A * | 12/1985 | Hawkins | B23B 51/0426 | 408/58 |
| 4,668,548 A | 5/1987 | Lankard | | |
| 4,744,693 A | 5/1988 | Smith | | |
| 4,809,788 A * | 3/1989 | Nelson | E21B 7/02 | 173/28 |
| 4,812,078 A | 3/1989 | Rivard | | |
| 4,909,575 A * | 3/1990 | Lupton | E01C 23/088 | 404/90 |
| 5,117,923 A * | 6/1992 | Wuhrer | E21B 6/00 | 173/128 |
| 5,244,304 A | 9/1993 | Weil | | |
| 5,287,740 A * | 2/1994 | Tomita | G01V 3/12 | 73/146 |
| 5,298,987 A * | 3/1994 | Tomita | E21B 47/002 | 702/6 |
| 5,320,188 A * | 6/1994 | England | E21B 21/07 | 175/207 |
| 5,385,425 A * | 1/1995 | Hayes | E02D 29/0266 | 404/85 |
| 5,799,738 A * | 9/1998 | Kromray, Jr. | E21B 7/028 | 173/28 |
| 5,913,638 A | 6/1999 | Lansdale | | |
| 7,914,618 B1 | 3/2011 | Krozel | | |
| 8,567,523 B2 * | 10/2013 | Stacy, II | E21B 7/00 | 175/57 |
| 9,203,226 B2 | 12/2015 | Miller | | |
| 9,485,468 B2 | 11/2016 | Pino | | |
| 9,574,321 B1 * | 2/2017 | Saulters | E02F 5/003 | |
| 9,873,992 B1 * | 1/2018 | Knapp | E21B 7/027 | |
| 9,896,889 B2 * | 2/2018 | Koskinen | E21B 21/01 | |
| 10,280,573 B1 * | 5/2019 | Knapp | E01C 23/094 | |
| 2002/0043409 A1 * | 4/2002 | Parkert | H02K 7/1807 | 180/53.4 |
| 2003/0007835 A1 * | 1/2003 | Jurshak | E01C 23/094 | 404/112 |
| 2003/0111266 A1 * | 6/2003 | Roach | B23Q 11/0046 | 175/203 |
| 2004/0149174 A1 | 8/2004 | Farrington | | |
| 2005/0036749 A1 | 2/2005 | Vogel | | |
| 2005/0189127 A1 * | 9/2005 | Martin | B23B 45/003 | 173/1 |
| 2007/0122243 A1 * | 5/2007 | Videtto | B23B 47/34 | 408/67 |
| 2007/0246262 A1 * | 10/2007 | Brookover | E21B 21/16 | 175/122 |
| 2008/0040945 A1 * | 2/2008 | Buckner | E02F 3/8891 | 34/406 |
| 2008/0100125 A1 * | 5/2008 | Staples | E01C 23/0885 | 299/105 |
| 2009/0185865 A1 * | 7/2009 | Sharp | F16L 55/18 | 405/157 |
| 2010/0215449 A1 * | 8/2010 | Kern | B23B 39/161 | 408/1 R |
| 2011/0247816 A1 * | 10/2011 | Carter, Jr. | E21B 43/26 | 166/298 |
| 2012/0211281 A1 * | 8/2012 | King | E21B 15/00 | 175/57 |
| 2013/0011198 A1 | 1/2013 | Purcell | | |
| 2013/0284070 A1 | 10/2013 | Dubey | | |
| 2015/0125218 A1 | 5/2015 | Gustavsson | | |
| 2016/0326871 A1 * | 11/2016 | Healy | E21C 37/12 | |
| 2016/0369610 A1 * | 12/2016 | Wright | E21B 43/01 | |
| 2016/0376767 A1 | 12/2016 | Miller | | |
| 2018/0106015 A1 | 4/2018 | Pino | | |
| 2018/0156357 A1 | 6/2018 | Pino | | |
| 2018/0274204 A1 * | 9/2018 | Costello | E02F 7/00 | |
| 2018/0274710 A1 * | 9/2018 | Strother | F16L 55/1683 | |
| 2018/0292027 A1 | 10/2018 | Pino | | |
| 2019/0086002 A1 | 3/2019 | Pino | | |
| 2019/0226603 A1 | 7/2019 | Pino | | |

OTHER PUBLICATIONS

Corning Fiber Optic Extenders, https://www.corning.com/worldwide/en/products/communication-networks/products/fiber.html, pp. 1-7.
SC Polymer, https://www.surecretedesign.com/product/liquid-concrete-polymer/, p. 1.
SCAG Giant VAC, http://www.giant-vac.com/, pp. 1-2.
DR Power Vacuum, https://www.drpower.com/, pp. 1-2.
Billy Goat vaccum, www.billygoat.com, pp. 1-2.
Ditch Witch, www.ditchwitch.com, p. 1.
Trenchers, www.vermeer.com, pp. 1-15.
Trenchers, www.samarais.com, pp. 1-2 .
King, "Google Fiber finishes digging very shallow grave in Louisville, KY. #RIP," https://1www.pocketables.com/2019/021 Joogle-fiber-finishes-digging-very-shallow-grave-in-louisville-ky-rip.html, published on Pocketable on Feb. 7, 2019, pp. 1-9.
Blum, "Microtrenching fail drives Google Fiber out of Louisville," https:/1www.tellusventure.com/blog/microtrenching- ail-drives-google-fiber-out--of-louisville/, published on Tellus Venture Associates, Feb. 8, 2019, pp. 1-3.
Otts, "Where is Google Fiber? Mostly in the Highlands, records show," hllps://www.wdrb.com/news/business/sunday- 3edition-where-is-google-fiber-moslly-in-the-highlands/article_569112e0-421 e-58ef-be24-c2e42e5e53d2.html, published in the Sunday Edition, WDRB, Sep. 14, 2018, pp. 1-10.
FASTRACT 400 material data sheet Aug. 23, 2018, pp. 1-4.
https://www.youtube.com/watch?v=0CGi92UK4Tw, Optic Fiber nastro in Torino, published Mar. 7, 2016, Garbin Group, pp. 1-3.
https://www.youtube.com/watch?v=klWluvLc5cl, The Ditch Witch MT12 MicroTrencher: Faster, Cleaner, Better, published Jun. 14, 2016, pp. 1-4.
https://www.youtube.com/watch?v=VWryq2nOA3U, Micro trenching | MTT-system, published Sep. 26, 2016, www.mttsystem.com, pp. 1-3.
https://www.youtube.com/watch?v=7xf2Ujax9hU, published Nov. 10, 2011, Micro-Trenching—alternative Möglichkeit zur Verlegung von Glasfaserkabeln, Schmidt@buglas.de, pp. 1-3.
https://www.youtube.com/watch?v=OlxA3gqNPkE, BVS-net, microtrenching, published Nov. 29, 2014, www.bvs-net.eu, pp. 1-3.
https://www.youtube.com/watch?v=929vJtv5Uxw, www, dellcron.com, published Feb. 10, 2018, pp. 1-3.
https://www.youtube.com/watch?v=8p4xHlwuMhl, Americicom, www.americomtech.com, Microtrenching, published Jun. 10, 2017, pp. 1-3.

(56) References Cited

OTHER PUBLICATIONS https://www.youtube.com/watch?v=57NBkB1y8iM, published Jan. 14, 2014, KNET Micro Trenching Solution, pp. 1-4.

* cited by examiner

ROADWAY ACCESS HOLE DRILL AND A METHOD OF MICROTRENCHING USING THE DRILL TO OPEN AN ACCESS HOLE IN THE ROADWAY

FIELD OF THE INVENTION

The invention generally relates to a roadway access hole drill and a method for creating a microtrench in a roadway and burying an optical fiber and/or innerduct/microduct below the roadway surface. The roadway access hole drill vibrates and rotates a drill bit to quickly cut an access hole in a roadway above a buried utility.

BACKGROUND OF THE INVENTION

Installing new optical fiber networks to a location is expensive and time consuming. There is a great need for faster and less expensive installation of optical fiber.

During installation of the optical fiber, a microtrench is cut in a roadway, the optical fiber and/or innerduct/microduct is laid in the microtrench and then a fill and sealant are applied over the optical fiber and/or innerduct/microduct to protect them from the environment. Methods of microtrenching that can be utilized in the present invention include the method described in my previous U.S. patent publication Nos. 20190226603, 20190086002, 20180292027, 20180156357, and 20180106015, the complete disclosures of which are incorporated in their entirety herein by reference.

Before cutting a microtrench in a roadway, the city must be notified. The city personnel will locate and mark buried utilities on the roadway. When a microtrench must cross a buried utility, the buried utility must first be exposed, which requires cutting an access hole through the roadway and then removing the dirt below the roadway through the roadway access hole. Currently, core saws, concrete saws, core drills and jack hammers are used to break through roadway, which takes about 25-30 minutes or more. The buried utility can be damaged by the current methods of opening the roadway. There is a need for a faster and safer method to open the roadway to expose the buried utility.

SUMMARY OF THE INVENTION

The present invention utilizes a roadway access hole drill comprising a down-the-hole jack-hammer drill (hereinafter DTH hammer), a motor to rotate the DTH hammer, and a debris containment collar to cover the drill bit in a novel and new way to provide an access hole in a roadway above a buried utility. The novel use of the DTH hammer provides a far faster and safer method to expose the buried utility. Using the present invention, the roadway can now be opened far faster, in about 5 minutes or less, compared to 25-30 minutes or more for conventional roadway cutting methods.

Objectives of the invention can be obtained by a method of installing optical fiber, innerduct or microduct under a roadway comprising:
  providing a roadway access drill comprising a down-the-hole hammer drill having a drill bit and a jack-hammer that vibrates the drill bit, and a motor attached to the down-the-hole hammer drill that rotates the drill bit;
  placing a debris containment collar on a roadway surface over a buried utility, the debris containment collar having a debris containment collar body defining a hollow chamber sized to accept the drill bit;
  inserting the drill bit into the hollow chamber of the debris containment collar so that the debris containment collar body surrounds the drill bit;
  activating the motor and jack-hammer to provide a rotating and vibrating drill bit;
  drilling an access hole in the roadway by lowering the rotating and vibrating drill bit into the roadway, wherein the debris containment collar prevents debris formed during the drilling from flying away;
  removing dirt below the roadway through the access hole to expose the buried utility;
  cutting a microtrench in the roadway using a microtrencher so that the microtrench crosses the buried utility and does not damage the buried utility;
  laying the optical fiber, innerduct or microduct in the microtrench; and
  filling the microtrench with a fill material to cover and protect the optical fiber, innerduct or microduct.

Objectives of the invention can further be obtained by a method of cutting an access hole in a roadway comprising:
  providing a roadway access drill comprising a down-the-hole hammer drill having a drill bit and a jack-hammer that vibrates the drill bit, and a motor attached to the down-the-hole hammer drill that rotates the drill bit;
  placing a debris containment collar on a roadway surface over a buried utility, the debris containment collar having a debris containment collar body defining a hollow chamber sized to accept the drill bit;
  inserting the drill bit into the hollow chamber of the debris containment collar so that the debris containment collar body surrounds the drill bit;
  activating the motor and jack-hammer to provide a rotating and vibrating drill bit; and
  drilling an access hole in the roadway by lowering the rotating and vibrating drill bit into the roadway, wherein the debris containment collar prevents debris formed during the drilling from flying away.

Objectives of the invention can also be obtained by a roadway access drill comprising:
  a down-the-hole hammer drill having a drill bit and a jack-hammer that vibrates the drill bit;
  a motor attached to the down-the-hole hammer drill that rotates the drill bit; and
  a debris containment collar having a debris containment collar body defining a hollow chamber sized to accept the drill bit and configured to contain debris.

DETAILED DESCRIPTION OF THE INVENTION

Figure 1:
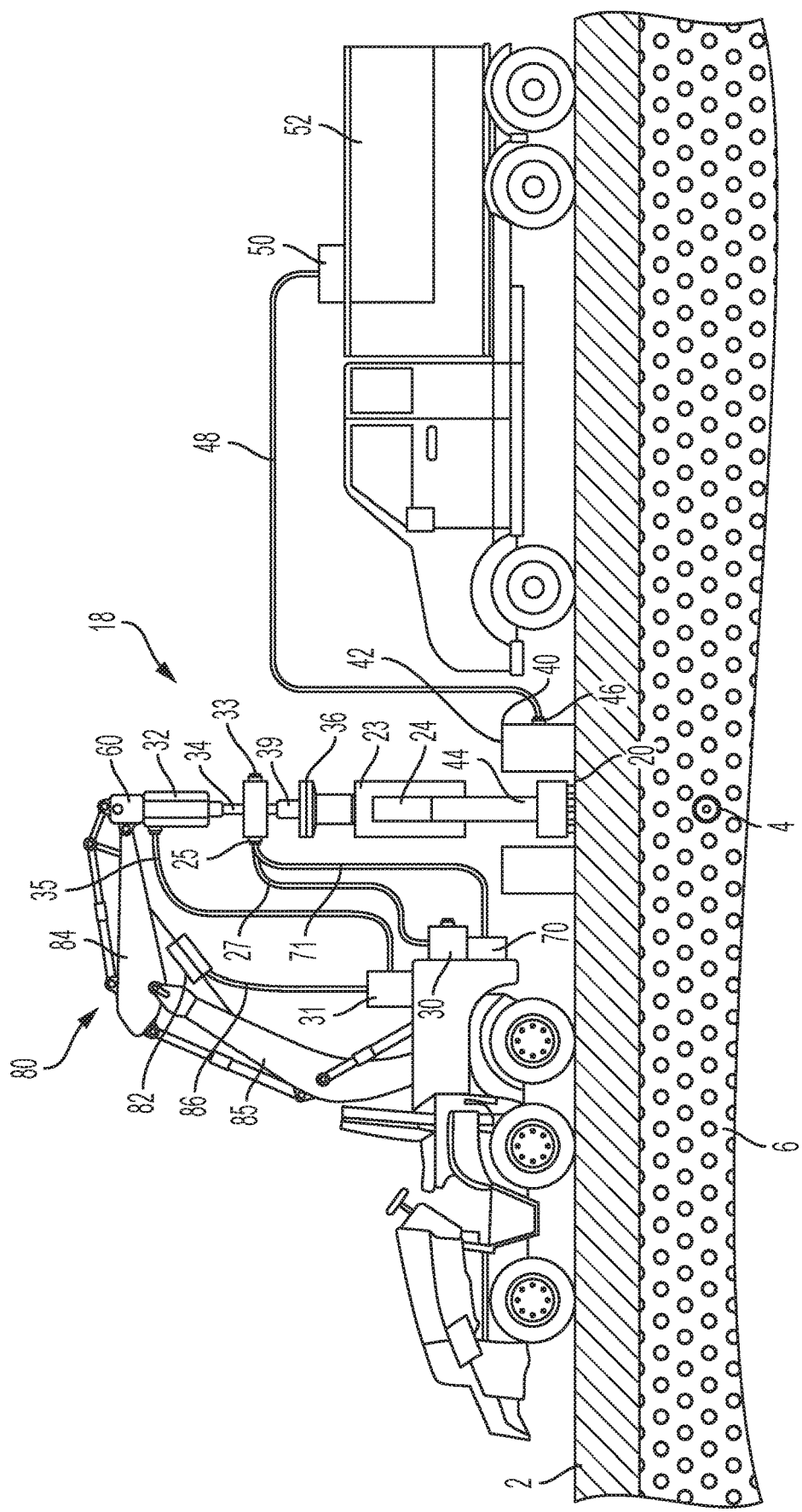
FIG. 1 illustrates a roadway access hole drill located over the roadway above a buried utility.

The invention will be explained by reference to the attached non-limiting Figs. DTH hammers are used to cut through rock down in a hole core. The following description is from Center Rock Products, www.centerrock.com, "Center Rock offers one of the most complete lines of down the hole drills and downhole bits ranging from 3.5"-36" (89 mm-914 mm) which are designed for peak performance in all rock drilling applications including but not limited to; foundation & geotechnical drilling, blasthole drilling in quarries & mines, waterwell & geothermal boreholes, oil & gas underbalanced drilling, horizontal directional drilling, and utility transmission & distribution rock sockets." Suitable DTH hammers for use in the present invention include those commercially available from Center Rock Products, Everdigm, Sandvik, and others, DTH hammers require large and tall machinery to hold the long pipe extensions in order to drill a deep hole. Furthermore, the DTH hammer is usually contained within and supported by the pipe during cutting the bore hole.

The novel use of the DTH hammer 23 in the present invention does not require the long pipe extensions, the DTH hammer 23 does not have to be contained within a pipe, and a novel debris containment collar is utilized in the present invention. Preferably, the present roadway access hole drill 18 utilizes a DTH hammer 23 as shown in the attached Figs. in which the DTH hammer 23 moves up and down a length required to cut through a roadway, such as less than 10 feet, preferably less than 5 feet. The roadway access hole drill 18 can include an attachment 60 for mounting to a backhoe, or other common construction device. The roadway access drill 18 preferably is configured to be driven by conventional construction power devices, such as hydraulic pressure, compressed air, electric, gas engines or diesel engines.

The DTH hammer 23 includes a drill bit 20 and a jack-hammer 24 for aggressively vibrating the drill bit 20. The jack-hammer 24 can be driven by pressurized fluid (hydraulic fluid) or compressed air. Preferably the jack-hammer 24 is driven by a mixture of compressed air and water so that when the water exits the DTH hammer 23 the water reduces the formation of airborne dust. The compressed air or hydraulic fluid (shown at 29) enters and flows through the DTH hammer 23 and then preferably exits (shown at 90) at the bottom near the drill bit 20. Any suitable source of compressed air or hydraulic fluid can be utilized. Instead of air, the jackhammer can be driven by electric, hydraulic, gas, or other, as desired. An air compressor 30 can be used as the source of compressed air to power or activate the jack-hammer 24. The DTH hammer 23 can have a diameter of about 6 to about 48 inches, preferably about 10 to about 24 inches. An example of suitable air pressure is 100 psi to 900 psi, preferably about 300 to 600 psi. The flow can be from 100 to 2000 cfm, preferably about 300 to about 1000 cfm. The example roadway access drill 18 shown in FIG. 1 was tested and cut a hole through a concrete roadway 2 in less than 5 minutes using about 500 psi in pressure and about 750 cfm in flow.

The roadway access drill 18 includes a motor 32 configured to rotate the drill bit 20, and usually the entire DTH hammer 23. The motor 32 can be powered by any desired source, such as electric, gas, diesel, or hydraulic. Preferably, the motor 32 is driven by a source of hydraulic pressure 31. Bore hole motors for rotating a DTH hammer 23 for making a bore hole are well-known and any suitable conventional bore hole motor can be utilized as the motor 32. Sources of hydraulic pressure are now well known and any desired source of hydraulic pressure 31 can be utilized, such as those used on backhoes and other equipment utilizing a hydraulic cylinder 82. A hydraulic fluid hose 35 can connect the motor 32 to the source of hydraulic pressure 31.

The motor 32 can be connected to the DTH hammer 23 by a drive connector 34. A collar connector 36 can be utilized to removably connect the DTH hammer 23 to the drive connector 34. The drive connector 34 can be a pipe having a hollow chamber 39. A swivel connector 33 can be used to supply compressed air and/or pressurized fluid to the hollow chamber 39. Swivel connectors 33 are now well known and any suitable swivel connector 33 can be utilized in the present invention, such as swivel connectors used in the oil and water well boring rigs. The chamber 39 connects the flow of compressed air and/or pressurized fluid from the swivel connector 33 to the DTH hammer 23. The compressed air and/or pressurized fluid powers flow into and powers or activates the jack-hammer 24 and then can flow out of the DTH hammer 23 near the drill bit 20. The swivel connector 33 encircles the drive connector 34 and is configured to allow the drive connector 34 to rotate within the swivel connector 33. The swivel connector 33 includes a compressed air connection 25 that can be used to connect to a compressed air hose 27, which can supply compressed air, a pressurized fluid, and preferably a mixture of compressed air and water to the swivel connector 33. The collar connector 36 can be a chuck, threaded connector, or any suitable device for removably connecting two shafts or pipes together, such as those used in oil or water drilling rigs.

A source of pressurized water 70 can be connected to a pressurized water hose 71 connected to the compressed air connection 25 to supply pressurized water along with the compressed air to the DTH hammer 23. The water exiting the DTH hammer 23 can reduce the airborne dust created during drilling the access hole. The water can be vacuumed up along with the debris using the debris containment collar 40. Sources of pressurized water 70 are now well known and any suitable source can be utilized, such as power washer water pressurizers.

Any suitable lifting device can be connected to the lifting attachment 60 and used to lift and lower the roadway access hole drill 18. A preferred example of a lifting device is a backhoe 80 having a boom 85 connected to an arm 84, a hydraulic cylinder 82 for moving the arm 84 in relation to the boom 85, the arm 84 is connected to the lifting attachment 60, and the hydraulic cylinder 82 is connected to the source of pressurized hydraulic fluid 31 by hydraulic cylinder hose 86. The engine of the backhoe 80 can be used to power a pump to pressurize the source of pressurized hydraulic fluid 31 in a conventional manner. Backhoes 80 are well-known and the hydraulic cylinder 82 can be operated in a conventional manner to lift and lower the arm 84.

The debris containment collar 40 that sits on a surface of the roadway 2 can take the place of the pipe conventionally used in bore holes, so that the drill bit 20 sits within the debris containment collar 40. The debris containment collar 40 is placed on the roadway 2 over the buried utility 4 to be exposed. The debris containment collar 40 comprises a debris containment collar body 42 defining a hollow chamber 44 that is sized to fit around the drill bit 20. A debris containment collar vacuum attachment 46 for attaching to a vacuum hose 48 attached to a source of vacuum 50. The debris containment collar 40 is configured to provide a vacuum to the hollow chamber 44 during use. During use, the debris containment collar 40 rests on the roadway 2 surface and the debris, such as dust, chips, particles, etc., and water if present are vacuumed away through the vacuum hose 48 and into a vacuum storage container 52. The debris containment collar 40 can also be used to align the drill bit 20. The vacuum hose 48 can be any size as desired, such as from 4 to 12 inches in diameter. Sources of vacuum 50 are now well known and any suitable vacuum source can be utilized, such as those made by SCAG Giant Vac., DR Power, Vermeer, and Billy Goat.

Figure 2:
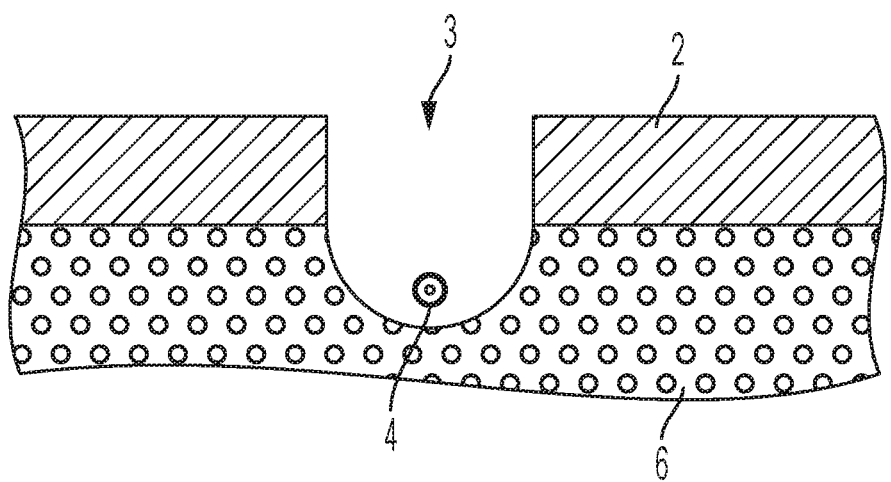
FIG. 2 illustrates hole in the roadway cut by the roadway access hole drill to expose the buried utility.

The Figs. show how the DTH hammer 18 can be used to cut an access hole 3 in the roadway 2 in a far faster and safer way than previous methods. In FIG. 1, the debris containment collar 40 is placed on the roadway surface over the buried utility. The drill bit 20 is inserted into the chamber 44. The motor 32 and jack-hammer 24 are activated to both rotate and vibrate the drill bit 20. The drill bit 20 is lowered to cut an access hole 3 in the roadway 2 as shown in FIG. 2. The dirt 6 below the roadway is then removed to expose the buried utility 4.

Figure 3:
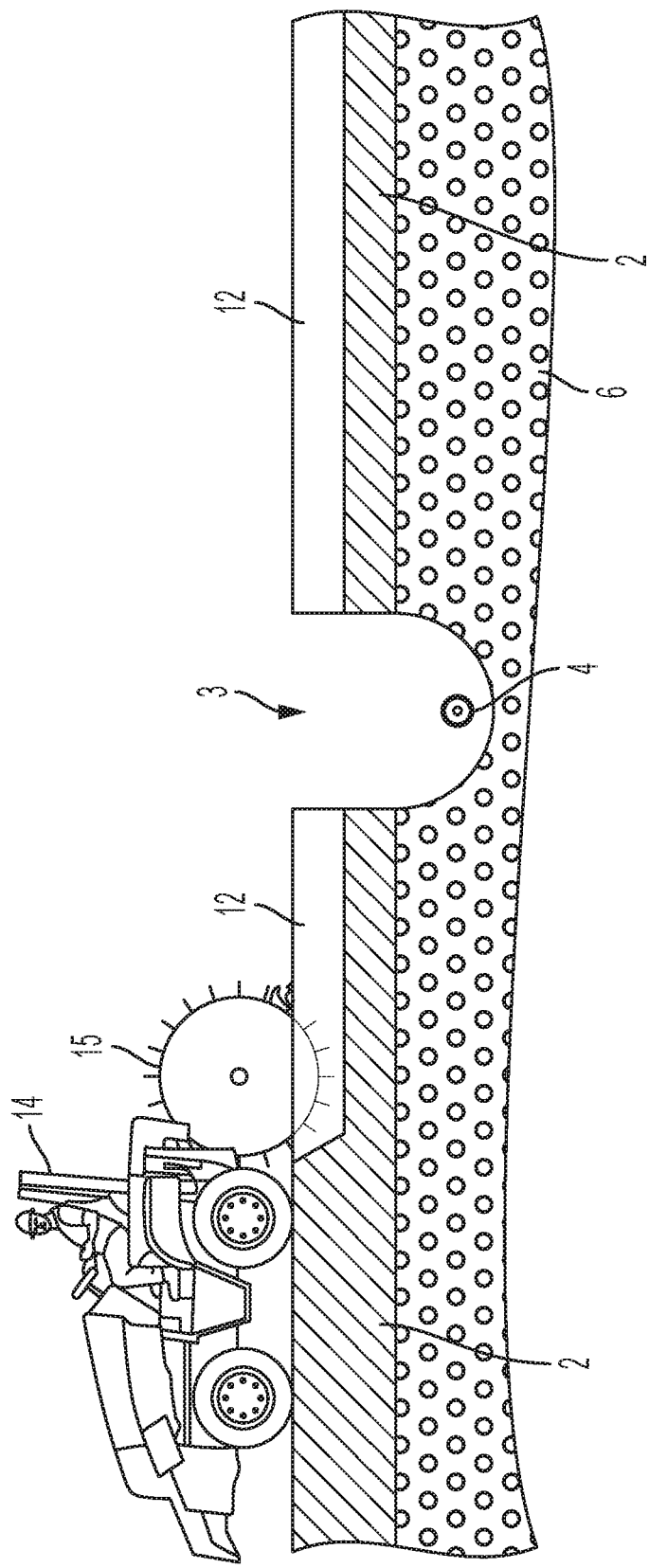
FIG. 3 illustrates a microtrencher cutting a microtrench in the roadway that crosses the exposed previously buried utility.
Figure 4:
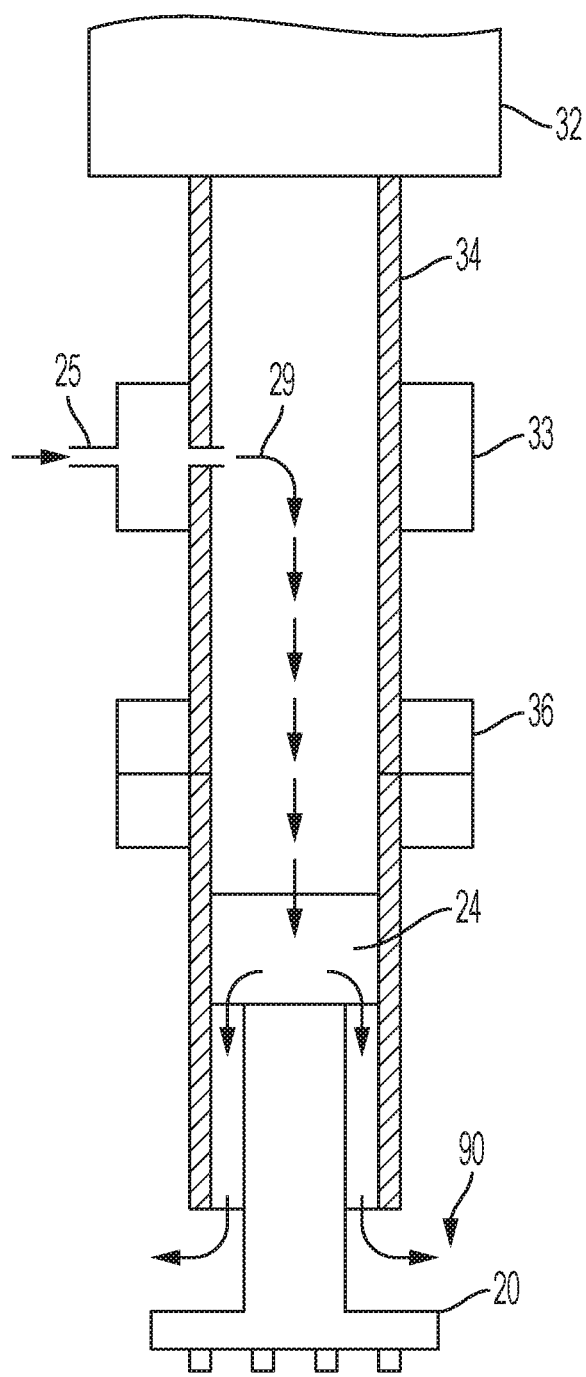
FIG. 4 illustrates air/water flow through the roadway access hole drill.
Figure 5:
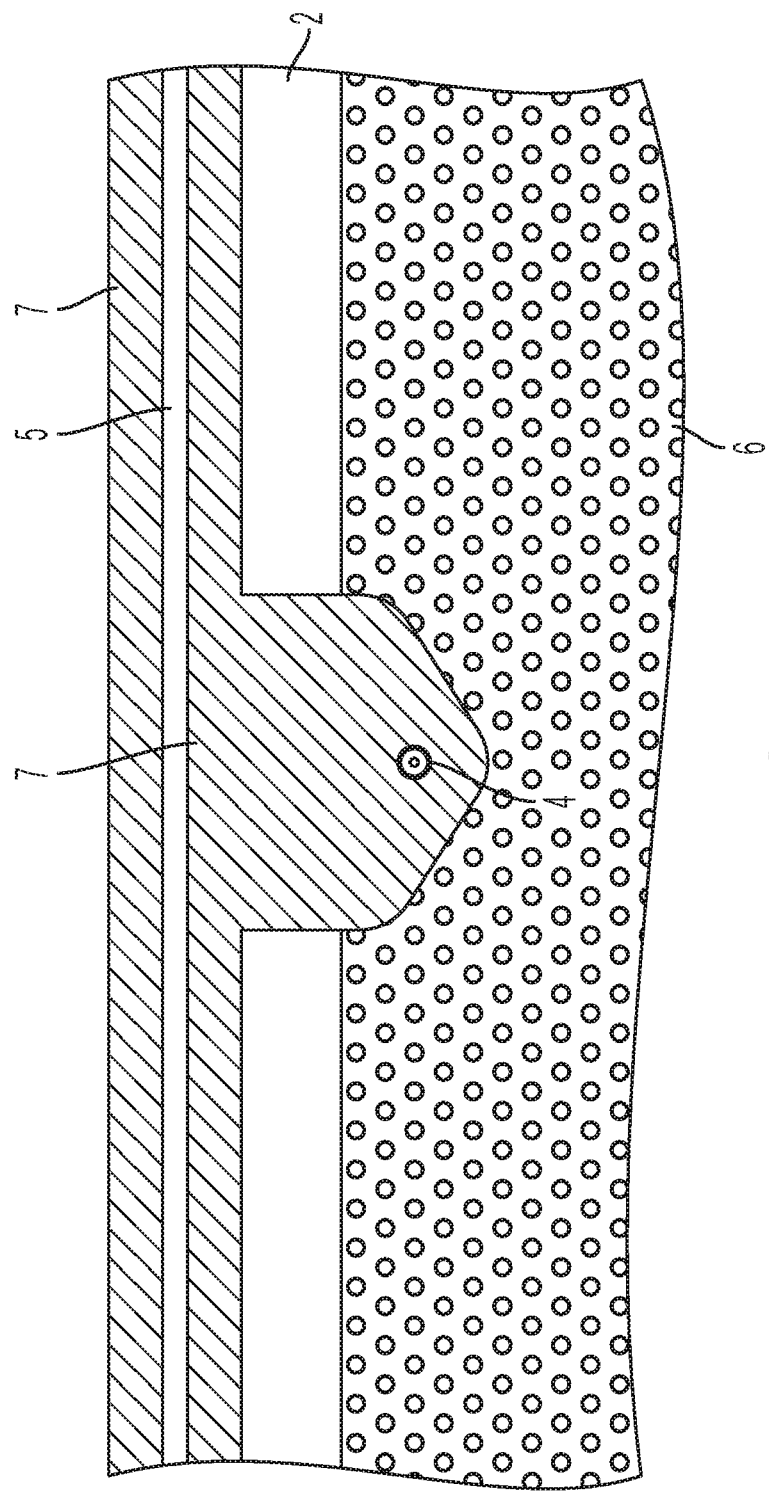
FIG. 5 illustrates an optical fiber sealed in the microtrench by a fill.
Figure 6:
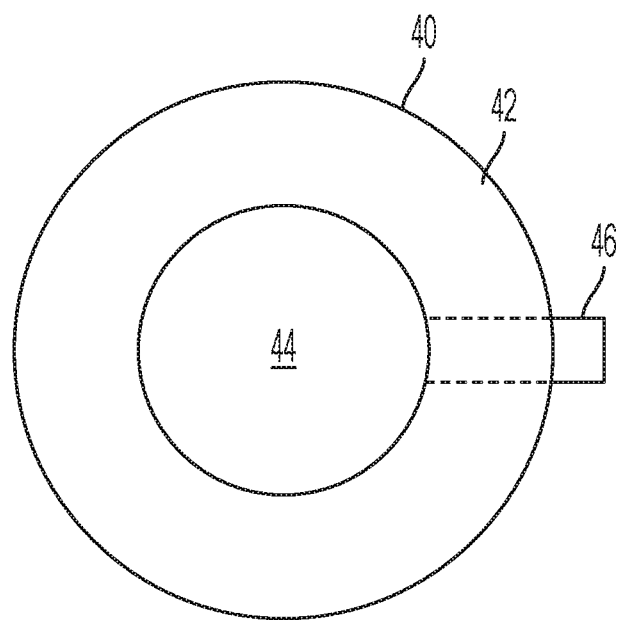
FIG. 6 illustrates a top view of a debris containment collar.
Figure 7:
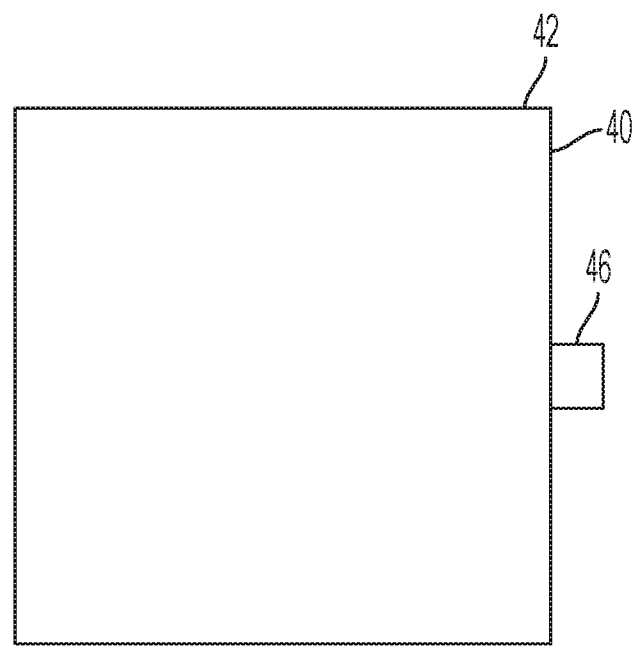
FIG. 7 illustrates a side view of a debris containment collar.

As shown in FIG. 3, once the buried utility 4 is exposed, a microtrencher 14 is used to cut a microtrench 12 in the roadway so that the microtrench 12 crosses the buried utility 4 without damaging the buried utility 4. As shown in FIG. 5, the optical fiber, innerduct, or microduct 5 can be laid in the microtrench 12, and the a fill 7 can be applied to cover the hole 3 and fill the microtrench 12 to cover and protect the optical fiber, innerduct, or microduct 5.

Any suitable microtrencher 14 can be utilized in the present invention. Non-limiting examples of suitable micro trenchers include those made and sold by Ditch Witch, Vermeer, and Marais. A Vermeer RTX 1250 tractor can be used as the motorized vehicle for the microtrencher 14. A microtrencher 14 has is a "small rock wheel" specially designed for work in rural or urban areas. The microtrencher 14 is fitted with a microtrencher blade 15 that cuts a microtrench 11 with smaller dimensions than can be achieved with conventional trench digging equipment Microtrench 11 widths usually range from about 6 mm to 130 mm (¼ to 5 inches) with a depth of 750 mm (about 30 inches) or less. Other widths and depths can be used as desired.

With a microtrencher 14, the structure of the road, sidewalk, driveway, or path is maintained and there is no associated damage to the road. Owing to the reduced microtrench 11 size, the volume of waste material (spoil 12) excavated is also reduced. Microtrenchers 14 are used to minimize traffic or pedestrian disturbance during cable laying. The microtrencher 14 can work on sidewalks or in narrow streets of cities, and can cut harder ground than a chain trencher, including cutting through for example but not limited to solid stone, concrete, and asphalt.

TERMS

2 Roadway
3 Access hole
4 Buried utility
5 Optical fiber, innerduct, microduct
6 Dirt
7 Fill
12 Microtrench
14 Microtrencher
15 Microtrencher blade
18 Roadway access hole drill
20 Drill bit
23 DTH hammer
24 Jack-hammer
25 Compressed air connection
27 Compressed air hose
29 Flow of compressed air/water
30 Air compressor
31 Source of pressurized hydraulic fluid
32 Motor
33 Swivel connector
34 Drive connector
35 Hydraulic hose
36 Collar connector
39 Hollow chamber
40 Debris containment collar
42 Debris containment collar body
44 Hollow chamber
46 Debris containment collar vacuum attachment
48 Vacuum hose
50 Source of vacuum
52 Vacuum storage container
60 Lifting attachment
70 Source of water
71 Pressurized water hose
80 Backhoe
84 Arm
85 Boom
82 Hydraulic cylinder
86 Hydraulic cylinder hose
90 Exiting air/water It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention. While the invention has been described to provide an access hole over a buried utility, the invention can be utilized wherever an access hole in the roadway is required.

The invention claimed is:

1. A method of cutting an access hole in a roadway comprising:
   providing a roadway access drill comprising a down-the-hole hammer drill having a drill bit and a jack-hammer that vibrates the drill bit, and a motor attached to the down-the-hole hammer drill that rotates the drill bit, and the roadway comprising asphalt and/or concrete;
   placing a debris containment collar on a roadway surface over a buried utility, the debris containment collar having a debris containment collar body defining a hollow chamber sized to accept the drill bit;
   inserting the drill bit into the hollow chamber of the debris containment collar so that the debris containment collar body surrounds the drill bit, the drill bit having a diameter of about 6 to about 48 inches;
   activating the motor and jack-hammer to provide a rotating and vibrating drill bit;
   powering the jack-hammer with compressed air from an air compressor; and
   drilling an access hole only in the roadway by lowering the rotating and vibrating drill bit into the roadway, wherein the debris containment collar prevents debris formed during the drilling from flying away, and wherein the rotating and vibrating drill bit is lowered less than 10 feet during drilling of the access hole.

2. The method according to claim 1, further providing a source vacuum to the hollow chamber of the debris containment collar and vacuuming debris from the access hole during drilling.

3. The method according to claim 1, further comprising powering the jack-hammer with compressed air and pressurized water, wherein water leaving the jack-hammer suppresses the formation of airborne dust during cutting of the access hole.

4. The method according to claim 1, further comprising attaching the roadway access hole drill to a backhoe, and using the backhoe to lift and lower the roadway access hole drill.

5. The method according to claim 4, further comprising attaching the motor to a source of pressurized hydraulic fluid present on the backhoe.

6. The method according to claim 1, wherein the rotating and vibrating drill bit is lowered less than 5 feet during drilling of the access hole.

* * * * *